United States Patent
Bar et al.

(10) Patent No.: US 8,498,877 B2
(45) Date of Patent: Jul. 30, 2013

(54) CONVERTING A COMPUTATIONAL FORMULA INTO EXECUTABLE CODE

(75) Inventors: Pascal Bar, Mouen (FR); Mehdi Jouan, Herouville Saint Clair (FR); Sébastien Savalle, Caen (FR)

(73) Assignee: SAP AG, Walldorf (DE)

( * ) Notice: Subject to any disclaimer, the term of this patent is extended or adjusted under 35 U.S.C. 154(b) by 224 days.

(21) Appl. No.: 13/059,275

(22) PCT Filed: Oct. 7, 2009

(86) PCT No.: PCT/EP2009/063033
§ 371 (c)(1),
(2), (4) Date: Feb. 16, 2011

(87) PCT Pub. No.: WO2010/043526
PCT Pub. Date: Apr. 22, 2010

(65) Prior Publication Data
US 2011/0145171 A1 Jun. 16, 2011

(30) Foreign Application Priority Data

Oct. 14, 2008 (FR) ...................................... 08 56963

(51) Int. Cl.
*G06Q 10/00* (2012.01)
*G07B 15/02* (2011.01)
(52) U.S. Cl.
USPC ............................. 705/1.1; 705/7.11; 705/13

(58) Field of Classification Search
USPC ........... 705/1.1, 7.11, 7.35, 13, 400; 717/114, 717/151, 153
See application file for complete search history.

(56) References Cited

U.S. PATENT DOCUMENTS

| | | | | |
|---|---|---|---|---|
| 6,964,042 B2 * | 11/2005 | Lagergren | ...................... | 717/153 |
| 2003/0002081 A1 * | 1/2003 | Leone et al. | .................. | 358/1.18 |
| 2007/0050603 A1 * | 3/2007 | Vorbach et al. | ............... | 712/221 |
| 2008/0295071 A1 * | 11/2008 | Schellekens | .................. | 717/106 |

FOREIGN PATENT DOCUMENTS

| | | | |
|---|---|---|---|
| EP | 1575005 | * | 2/2005 |
| WO | WO02/08863 A | | 1/2002 |
| WO | WO2004/016066 A | | 2/2004 |

\* cited by examiner

*Primary Examiner* — George Chen
(74) *Attorney, Agent, or Firm* — Kenyon & Kenyon LLP

(57) ABSTRACT

This method of converting a computational formula having been acquired in the form of a tree structure containing at least one node associated with a parameterized conditional branching operation and connected to at least a first and a second child node, the child node which is associated with the operation which is not executed and the set of nodes which have this child node as parent node being called 'dead branch', this method comprising: —the identification and the deletion (198) of the dead branch corresponding to the acquired value of a conditional parameter so as to obtain a computational formula pruned of this dead branch, and—the compilation (208) of the computational formula pruned of the dead branch so as to obtain the code executable by a chip card.

12 Claims, 4 Drawing Sheets

CONVERTING A COMPUTATIONAL FORMULA INTO EXECUTABLE CODE

RELATED APPLICATIONS

This is a national phase application of international application No. PCT/EP2009/063033 filed on Oct. 7, 2009 that claims priority from FR 0856963 filed Oct. 14, 2008.

BACKGROUND/DESCRIPTION OF THE RELATED ART

Patent application WO 2004/016066 filed in the name of the Highdeal Company describes a computational formula editor able to: acquire a computational formula in the form of a tree structure, and record the computational formula acquired in an XML file (eXtensible Markup Language). The computational formulas in the form of a tree structure make it possible to define in a simple fashion very complex computational formulas. These computational formulas may be complex because they may include three large parameters, the values of which may be unknown at the moment of their definition.

A computational formula may be used to calculate the cost or a price of a service. In this case, the computational formula may be so designated using the term "tariff package".

Typically, a tariff package includes subscription parameters. The values of these subscription parameters may be only known at the moment of the subscription, i.e., at the time where a consumer subscribes to the tariff package defined by a service provider. After subscribing to a tariff package, this consumer may be called a "client". For example, the following parameters may be the subscription parameters, which may include: the age of the client, the place of residence of the client, the tariff options chosen, their telephone number, and so on.

A tariff package also frequently includes historical consumption parameters stored in the counters. The values of these counters may be known as the consumption of the priced service occurring by this offer. For example, a tariff package may include a sliding-scale tariff based on the history of consumption or even price reductions attributed based on the amounts previously consumed.

The editor that is described in patent application WO 2004/016066 is able to simply define these types of tariff packages.

Then, the XML file containing the tariff package, which may be edited, may be sent to an electronic valorization system. This valorization system contains this tariff package for each client, which may include:
- the XML file containing the tariff package,
- the value of the subscription parameters and, possibly, history of consumption, and
- one or more balances in which the costs of or the services consumed may be collected.

Each time a client uses the service, a consumption ticket may be sent to the valorization system. This consumption ticket may contain:
- the consumption data that characterizes usage of the service, and
- the client user name that consumed the service.

The consumption data may include, for example, the volume or the quantity of service consumed as well as other information, such as the date and time the service was consumed.

In response to receiving the consumption ticket, the valorization system may scroll through the tariff package from the root node to the terminations in order to calculate the cost of the service consumed. In order to accomplish this, it may use, together with the consumption data, the value of the subscription parameters and the client's consumption history. The cost of the service thus calculated may then be added to the balance of the client.

The balance of the client may be a prepaid account. In this case, the accumulation of the service cost may reduce the initial amount of the balance of the calculated cost each time the service may be consumed until the credit may be exhausted on this prepaid account. Conversely, the balance may be a credit account. In this case, the costs may accumulate on the balance by adding the cost calculated to the previous calculated costs. The total amount indicated by the balance may then be invoiced from time to time before this balance may be reset.

The valorization system may calculate the costs for all the services consumed and for the group of clients. Thus, the work charge being given that represents for the valorization system, the charge of the calculation in real time of the cost of a service, may increase with the number of clients and services to be valued. Furthermore, the calculation of the cost of a service generally assumes that the valorization system receives consumption tickets. However, these consumption tickets may be transmitted by a point of sale or mobile terminal to the valorization system via a network. Thus, calculation of the cost of a service may be impossible in the absence of a network connection.

To remedy these problems, in the particular case of telephone calls, calculating the cost of telephone calls in mobile phones has already been proposed by launching a cost calculation application in a mobile phone see, for example, WO 02/08863. Implementing the tariff package in a smart card connected to the mobile phone has also already been suggested.

However, a tariff package such as that developed by the editor described in application WO 2004/016066 cannot be implemented in a smart card. In effect, this would be tantamount to launching the following in each client's smart card:
- the aforementioned valorization system,
- each tariff package to which the client has subscribed, and
- the value of each subscription parameter and the history of consumption.

However, the set of commands and the memory of a smart card may be much more limited than those of a PC computer or server. Thus, it proved that:
- the set of commands necessary to implement the valorization system in the smart card was too limited,
- the size of the executable code corresponding to the valorization system could not be reduced to a sufficiently small size to be able to be launched in a smart card, and
- the number of tariff package parameters was frequently too high to be able to be implemented in a smart card.

SUMMARY OF THE INVENTION

The invention may overcome these limitations by proposing a computational formula conversion method, acquired in the form of a tree structure, in code executable by a smart card, which may enable implementation in the smart card of computational formulas involving a set of commands that may be too complex to be directly implemented on a smart card or a number of parameters which would be too high to be accepted by a smart card.

Embodiments of the invention may include a method of conversion as well as a converter to convert a computational formula in executable code for a smart card chip card. Embodiments of the invention may also include a computer program and an information recording medium to implement the above mentioned method. Lastly, an embodiment of the invention may include a method to implement said computational formula in a smart card.

The computational formulas concerned may include formulas:
- having a tree structure made up of nodes interconnected by branches, each node being associated with a computational operation and the relations by branch defining the order in which these computational operations must be carried out, and
- having been recorded in a structured digital format that retains the tree structure of the computational formula acquired, The tree structure may contain at least one node associated with a parameterized conditional branching operation and connected to at least a first and a second child node, so that as a function of the value of a conditional parameter, only the operation of the first child node and, alternatively, only the operation of the second child node may be executed.

The child node that may be associated with the operation that need not be executed and the set of nodes which have this child node as parent node may be called "dead branch".

To simplify, the terminology associated with a tree structure in embodiments described in this specification may be defined to a particular default case where said tree structure may be oriented from the left to the right. However, this terminology might easily be adapted to tree structures oriented differently such as right to left in other embodiments.

A tree structure may be defined as a structure created from nodes interconnected by branches. In this structure, with the exception of a root node, each node may be connected from the left side to a single parent node. From the right side, each node may be connected to no other node, to a single, or to multiple child nodes. A node may be called a "terminal node" or "termination" when it may be connected from the left side to a single parent node and any child node on the right side. A terminal node thus forms the end of one branch in the tree structure.

The descendents of a parent node may be a set of nodes connected from the left side directly to its parent node our via one or more other nodes.

An embodiment of the invention may also include a conversion method of a computational formula in code executable by a smart card, in which the method may include:
- the acquisition of a conditional parameter value,
- the identification and suppression of the dead branch corresponding to the value acquired from the conditional parameter to obtain a computational formula pruned from the dead branch, and
- the compilation of the computational formula pruned from the dead branch to obtain the code executable by the smart card.

The compilation of the computational formula pruned from the dead branch simultaneously may make it possible to reduce both the number of parameters used by the computational formula and also the complexity thereof. Indeed, the parameters and the operations that may be associated only with nodes belonging to this dead branch may be deleted. Consequently, the computational formula pruned from this dead branch may be very simple and may include less parameters than the initially defined computational formula. The executable code obtained from this pruned computational formula may thus also be very simple, less voluminous and thus easier to implement in a smart card.

This simplification of the computational formula need not be made at the detriment of the complexity and expressivity of the initial computational formula. Thus, the initial computational formulas may be defined with great freedom of choice with respect to the number of parameters and to the complexity of the operations carried out without this preventing the attainment of a code executable by a smart card.

Thus, this process may solve the following contradiction:
1. the need to allow great flexibility to the service providers in the definition of the tariff packages, which implies allowing the possibility of defining tariff packages with a great number of parameters and diverse and complex operations, and
2. the need to limit the number of parameters of a tariff package and the complexity of the operations carried out to allow transporting the tariff package within the smart card.

Embodiments of this method of conversion may include one or more of the following characteristics:
- For a computational formula acquired in the form of a tree structure, including at least one processing node associated with a parametric operation which may include several alternative and alternatively executable processes, each alternative process may be associated with a particular value or with a particular range of operational parameter values so that this alternative process may be executed only when the operational parameter matches this value or may be included in this range of values, the process of which includes:
  - the acquisition of this operational parameter value,
  - replacement of the parametric operation of the processing node by an operation free of the alternative processes associated with the values that the operational parameter can no longer take due to its acquired value, and
  - compilation of the computational formula in which the parametric operation of the processing node may be replaced by the operation free of alternative processes; the method includes:
- the association to each node possible for defining a computational formula of the weight representing the size of the executable code fragment to be implemented in the smart card in order to execute the operation associated with this node,
- the estimation of the total size of the executable code to be implemented in the smart card in order to execute the computational formula of the weight associated with each of the nodes of this computational formula,
- the comparison of this total size estimation of the executable code with a preset limit, and
- information displaying that this limit has been surpassed when the limit may be surpassed;
- the digital structured format that conserves the tree structure may be a format stemming from the SGML language Standard Generalized Markup Language such as the XML format eXtensible Markup Language;
- the computational formula may be a formula to calculate the cost of a service.

Furthermore, some embodiments of the conversion method may present the following advantages:
- the replacement of the parametric operations by the operations including fewer parameters making it possible to limit the number of parameters and the complexity of the operations performed by the computational formula so that it becomes more easily implemented within a smart card,
- the estimation of the size of the executable code that will be obtained even before the compilation makes it possible to inform the user well in advance that the tariff package currently used may not be converted into an executable code by the smart card.

An embodiment may also include a computer program and a recording medium including commands for the execution of the above described method of conversion when these commands may be executed by an electronic calculator.

An embodiment may also include a method to implement a computational formula in a smart card, that method including:

the acquisition of this computational formula in the form of a tree structure created from nodes connected together by branches, each node being associated to a computational operation and the connections by branch define the order in which these computational operations must take place, this tree structure containing at least one node associated with a conditional parametric branching operation and connected to at least one first and one second child node so that, based on the value of the conditional parameter, single operation of the first child node and, alternatively, only the operation of the second child node may be executed, recording this formula in a structured digital format that retains the tree structure of the computational formula acquired, the acquisition of the conditional parameter value, the conversion of the computational formula in an executable code by the smart card using a method according to another embodiment, downloading the executable code into the smart card, then executing this computational formula in this smart card in response to the receipt of consumption data for a service in order to calculate a cost for the service consumed.

An embodiment of a method to implement a computational formula may include one or more of the following characteristics:

the association of the size of the executable codes that have already been downloaded into the smart card to a user name for this smart card, before the comparison of the estimate of the total size of the executable code with the preset limit, the acquisition of the user name from the smart card to which the executable code must be downloaded and the establishment of the limit based on the size of the executable codes associated with the smart card user name acquired;

the smart card download of several executable codes independently of each other and the association of each of these executable codes with a service user name, the receipt by the smart card of consumption data containing a user name for the service consumed, and the execution by the smart card of the single executable code corresponding to the service user name received in order to calculate the cost of the service consumed.

Furthermore, an embodiment of these implementation methods may present one or more of the following advantages:

restoration of the limit beyond which the user may be informed that the tariff package cannot be converted to an executable code by the smart card based on the executable codes already downloaded in that smart card makes it possible to adapt the conversion method based on the smart card to be programmed, and the separate execution of each executable code enables the implementation, spread out over time, in the smart card of several computational formulas, which need not be predictable, that are not able to be implemented in the smart card if one and the same program receives a command to carry out all these calculations.

An embodiment may include a computational formula converter including:

an acquisition module of the conditional parameter value, a semantic analyzer capable of identifying and removing the dead branch corresponding to the value acquired from the conditional parameter to obtain a computational formula pruned from the dead branch, and a code/compiler generator capable of compiling the computational formula pruned from the dead branch in order to obtain the code executable by the smart card.

BRIEF DESCRIPTION OF THE DRAWINGS

The invention may be better understood by reading the description that follows, given only as a non-restrictive example and made in reference to the drawings in which.

In these figures, the same references may be used to designate the same items.

DETAILED DESCRIPTION

Figure 1:
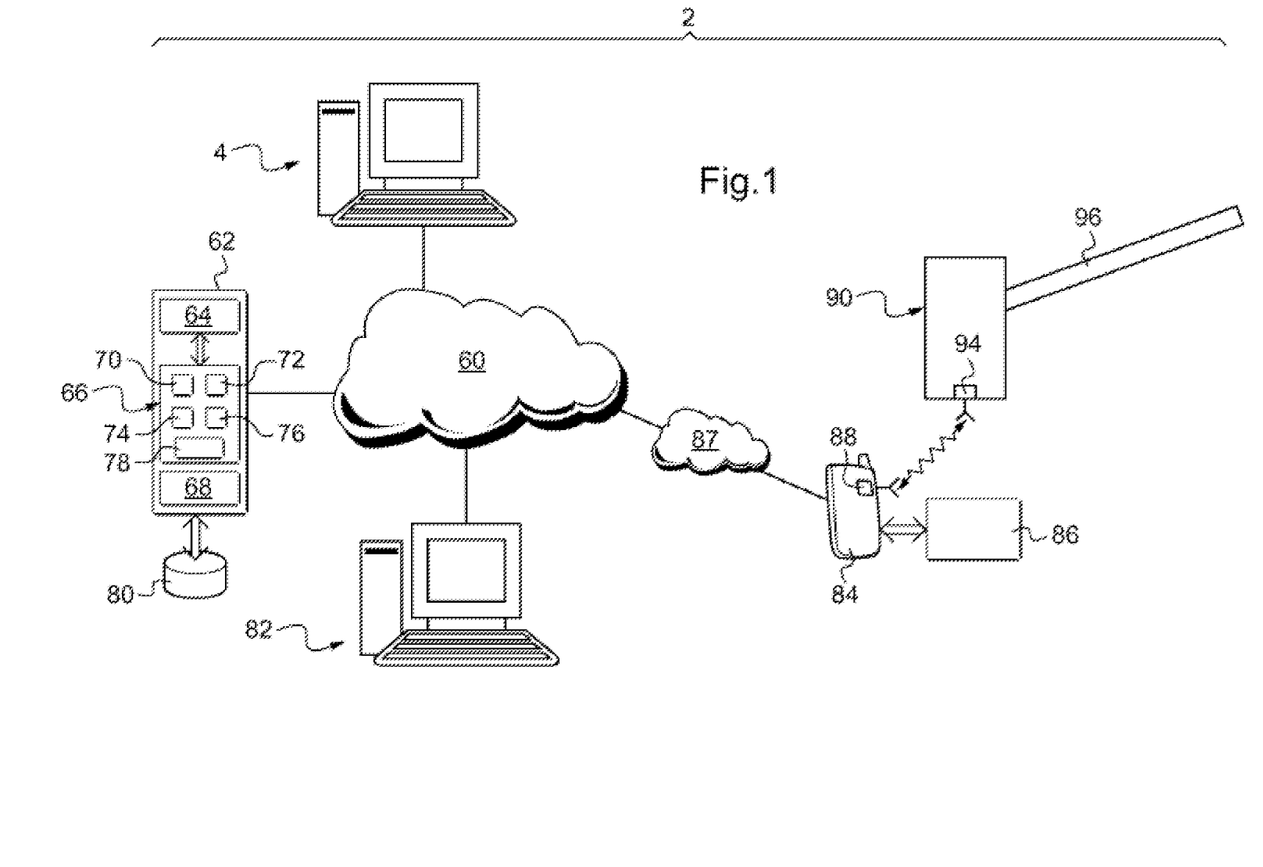
FIG. 1 is an illustration of a system to implement a computational formula in a smart card as well as the use of the on-site computational formula in an embodiment of the invention.

FIG. 1 shows an exemplary implementation and usage system 2 of the computational formula in a smart card. In this figure, the description that follows may be made in the specific case where the computational formula may be a computational formula for the cost of a service. It may thus be called a "tariff package". The system 2 may include an electronic editor 4 of a tariff package. For example, an editor 4 may include one described in the patent application WO 2004/016066.

This editor 4 may enable a tariff package to be acquired in the form of a tree structure and to be recorded in a digital format which conserves the tree structure. For this purpose, the tariff package may be recorded in a file in which the tariff package may be described in SGML language Standard Generalized Markup Language. Here, the tariff package contained in the file may be described in XML language Extensible Markup Language.

The tree structure of the tariff package may be freely definable by a service provider. Thus, the structure of the tariff package itself, i.e., the order in which the different operations must be executed, need not be known in advance.

Figure 4:
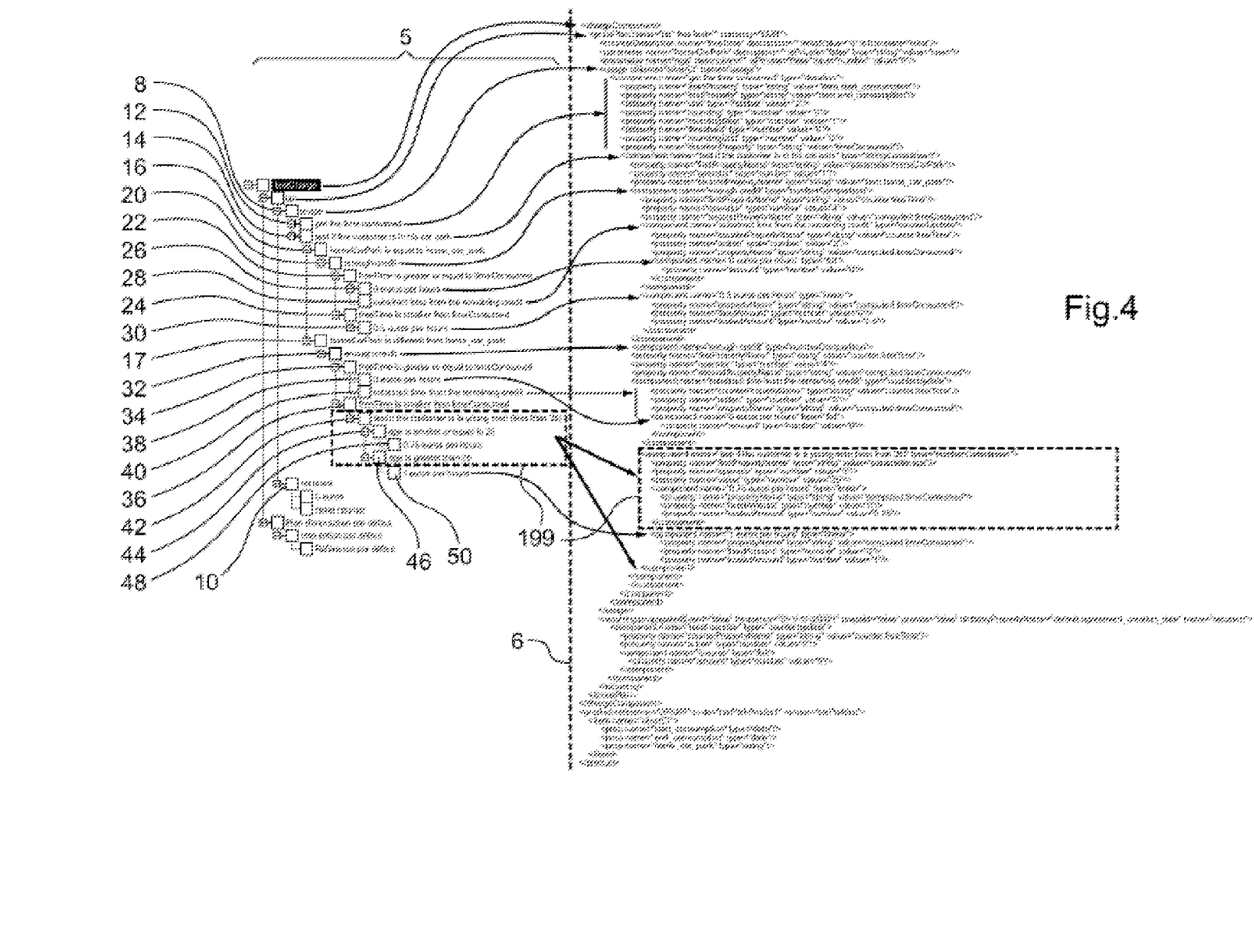
FIG. 4 is a diagrammatical illustration of the tree structure of a computational formula as well as the corresponding digital file in an embodiment.

An example of a tariff package 5 acquired in the form of a tree structure may be shown to the left of the vertical line 6 in FIG. 4. Here, this tariff package 5 may be a package designed to quote the cost to park a vehicle either in residential parking or in other parking situations. This tariff package may be therefore presented in the form of nodes connected by branches to other nodes up to a node forming a termination. Here, only the nodes which may be important for understanding the invention may be described. To the right of each node, the name of that node may be indicated. This name may be found in the XML file the content of which may be shown at the right of line 6.

This tariff package may be broken down into two main parts, a quote of the usage and a recurring quote. To define these two parts, the tree structure may include, respectively, two event nodes 8 and 10.

Travel from the tree structure starting at the node 8 may be triggered in response to receiving a consumption ticket emitted by a point of sale. Here, the point of sale may be an access point to pay for parking.

Travel through the tree structure from the node 10 may be triggered at regular intervals, for example, at the beginning of each month.

Travel through the tree structure may be always made from the direction of the root node towards the terminals.

Node 8 may be connected to two child nodes 12 and 14. The child node 12 may be a node associated with an operation to acquire the duration of the parking Node 14 may be a decision node. Here, this node 14 may be associated with a conditional parametric branching operation. More precisely, the node 14 may be in charge of testing whether the client's vehicle may be garaged in their residential parking or in another parking situation. In the case where the vehicle may be garaged in their residential parking, only the child node 16 may be activated. If not, only a child node 18 may be activated.

Node 16 may be connected to a child decision node 20. This child node 20 tests to see whether the time period of the parking may be lower than a free parking time period. If it may be, it activates a child node 22 while if not, only a child node 24 may be activated. Node 22 may be connected to two child decision nodes 26 and 28. Child node 26 indicates that the cost of parking may be equal to 0€ while node 28 subtracts the parking period acquired from the free parking period. In this way, the free parking period gradually reduces the consumption of this service.

Node 24 activates a child node 30 which multiplies the parking period beyond the authorized free period by a preset non-zero hourly rate. Thus, the node 24 may be associated with an operation that calculates the cost of parking in the case where the parking time period exceeds the remaining free parking time period.

Node 18 may be connected to a child decision node 32 to node 20. This node 32 may be connected to the child nodes 34 and 36 respectively identical to child nodes 22 and 24. This node 34 may be connected to the child nodes 38 and 40 respectively identical to nodes 26 and 28.

Node 36 may be connected to a decision node 42 that tests the age of the client. The age of the client may be acquired during the subscription to this package.

Node 42 activates a child node 44 if the age of the client may be lower or equal to 25 years and, alternatively, a child node 46 if the age of the client may be greater than 25 years.

Node 44 may be connected to a child node 48 that calculates the cost of the service by multiplying the parking time period that exceeds the free parking time period by an hourly rate greater than that used by the operation associated with node 30.

Node 46 may be connected to a child node 50 that calculates the cost of parking by multiplying the parking time period that exceeds the free parking time period by an hourly rate greater than that used by node 48.

This tariff package contains then two subscription parameters, i.e., the age of the client and a user name of their residential parking After having been acquired, the tariff package 5 may be recorded in an XML files the content of which may be shown to the right of this line 6. The arrows that traverse line 6 indicate the command lines in XML language that corresponds to each tariff package node 5.

In this XML file, the branches between the nodes may be replaced by nesting tags, defining each of the nodes, some inside the others More specifically, the definition of each node begins with a start-tag ""<component name= . . . />" and it ends with the end-tag "</component>". Between a start or end tag, defining a node, the start-tags and end-tags may be found of the child nodes of that node. This enables identification of the order relationship between these nodes.

Here, each start-tag "<component . . . />" includes the attributes "name" and "type". The value of the attribute "name" may be the same as the name of the node.

The value of the attribute "type" indicates the operation that may be associated with that node. This value corresponds to a preset code and interpretable by a tariff package converter.

The tags "<property . . . />", that may be found between the start-tag and the end-tag of a node, defining the name of the variables and parameters of the operation associated with a node.

The editor 4 may be connected via the information transmission network 60 to a server 62. For example, the network 60 may be the Internet network.

The server 62 includes:
a tariff package layout module 64 using the editor 4,
a tariff package converter 66 in code that may be executable by a smart card, and
a executable code download module 68 built by the converter 66 within a smart card.

For example, the module 64 may be an Internet server that enables presenting the different available tariff packages to the consumer for the different service providers.

Specifically, the module 64 enables the consumer to select from among several tariff packages, the one to which the consumer may wish to subscribe. The module 64 also enables the consumer to transmit all the information that makes it possible to implement the tariff package.

The converter 66 includes:
a module to acquire 70 the subscription parameters transmitted by the consumer through the packages presented by the module 64,
an on-board verifier 72 of the tariff package subscribed to in a smart card,
a semantic analyzer 74 able to simplify the tariff package based on the subscription parameters transmitted by the client,
a Java JavaCard® code generator 76, and
A Java JavaCard® code compiler 78 capable of generating an executable applet by a smart card.

For example, the compiler 78 may be one of those proposed by the SUN Microsystem® Company.

The server 62 may be typically built starting with programmable calculators capable of executing recorded commands on
an information recording medium. Here, to this effect, the server 62 may be linked to a memory 80 including the commands necessary for executing the methods shown in FIGS. 3 and 5. More precisely, here, the module 6, the converter 66, and the compiler 68 may be shown in the form of computer programs executable by the server 62 and the commands of which may be recorded in the memory 80.

As an illustration, a single subscription item 82 was shown. This item 82 may be linked to the server 62 via the network 60. Typically, this subscriber item may be a PC Personal Computer type of computer equipped with an Internet browser. This item may be intended to be used by the client during subscription to a tariff package proposed and presented by the module 64.

A mobile terminal 84, equipped with a smart card 86, it may be also linked to the server 62 via the network 60 and a wireless telephone network 87. This terminal 84 may be typically a terminal belonging to a client. For example, here, this mobile terminal may be a mobile telephone.

To simplify the illustration, the smart card 86 was shown on the side of the terminal 84. However, typically, it may be housed inside the terminal 84. Here, we may be dealing with a SIM card Subscriber Identity Module of a mobile telephone.

The terminal 84 may be equipped with a short range emitter/receiver 88. For example, the emitter/receiver 88 may be a radio emitter capable of establishing a wireless connection with a point of sale 90. To this effect, each point of sale may be also equipped with a wireless emitter/receiver 94.

The point of sale 90 may be an automaton capable of delivering a service in response to the validation of the purchase of this service transmitted by the terminal 84. As an illustration, the point of sale 90 orders the opening of the barrier 96 enabling the client exit the parking once the corresponding payment has been made.

Figure 2:
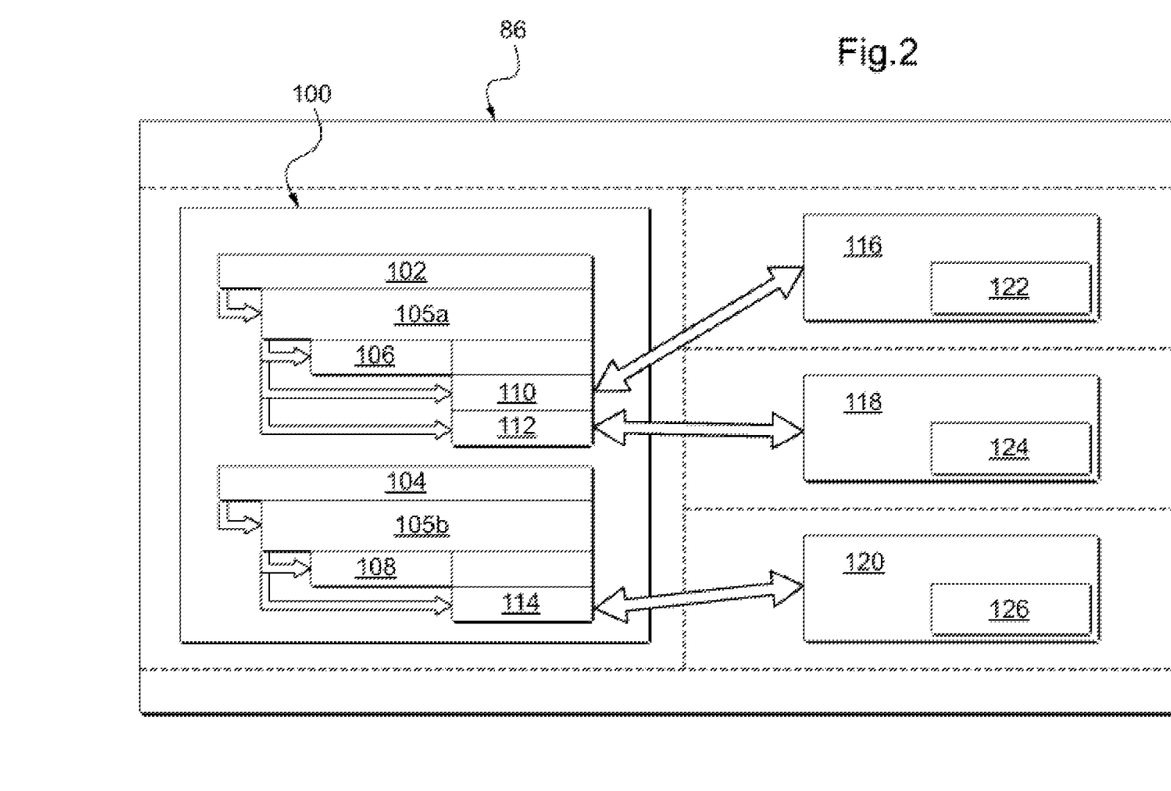
FIG. 2 is a diagrammatic illustration of the smart card's architecture in which the computational formulas may be implemented using the system shown in FIG. 1 in an embodiment.

FIG. 2 shows the smart card 86 more in detail. The smart card 86 may be a smart card in accordance with JavaCard® specifications. It may be capable of executing the applications implemented in its memory. More precisely, it may be equipped with a virtual JavaCard® that interprets the executable code of the applications implemented. These applications may be known by the English term "Applet". Here the term "executable code" may be 35 as well to indicate a code intended to be interpreted by a virtual machine as a code designed to be executed directly by a calculator.

Here, the card 86 has a valorization engine 100 on board. This valorization engine 100 stores a certificate for each service provider. For example, in FIG. 2, two certificates 102 and 104 may be shown. These certificates may be cryptographic certificates. Each certificate contains the service provider's user name and a public encoding key corresponding to the private key of this service provider.

Whenever the client may be subscribed to a service from a service provider, the engine 100 includes a subscription account. For example, in FIG. 2, the engine 100 includes two subscription accounts 105a and 105b.

Each subscriber account may be associated with a service provider certificate. Furthermore, each subscriber account possesses one or more balances as well as one or more links to the on board cost calculation applications.

As an illustration, the accounts 105a and 105b include, respectively, the balances 106 and 108. Account 105a also includes two links 110 and 112. Account 105b also includes a link 114. Each one of these links points towards a respective cost calculation application. For example, here, links 110, 112, and 114 point respectively to applications 116, 118, and 120. Each of these cost calculation applications 116, 118, and 120 may be recorded in an isolated memory and protected so that the execution of these applications may be only launched from the links contained in the engine 100.

Each of these applications 116, 118, and 120 generates a local non-volatile memory in which the value of different variables may be recorded between two executions of this application. Typically, this local memory may be used to record the historical parameters of consumption in the counters. For example, applications 116, 118, and 120 may be respectively associated with local memories 122, 124, and 126. These local memories 122, 124, and 126 may be reserved for the usage of the application with which they may be associated. Each application 116, 118, and 120 corresponds to the executed code recorded in the smart card 86. This executable code may be that obtained after conversion of a tariff package into an executable code by the converter 66. Here, this executable code may be of the Bytecode produced by a JavaCard® compiler.

Figure 3:
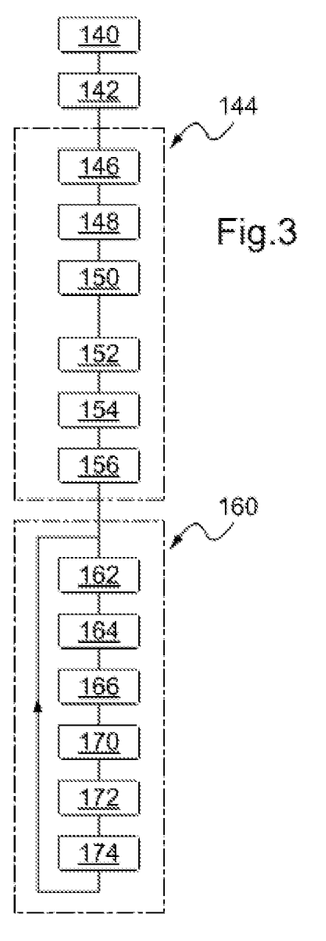
FIG. 3 is an illustration of an organization chart of a method to implement a computational formula in a smart card as well as the use of this computational formula in an embodiment.

The operation of the system 2 will now be described more in detail with respect of the methods of FIGS. 3 and 5.

Initially, during one stage 140, a service provider defines a tariff package using the editor 4. This tariff package may be defined and acquired in the form of a tree structure. For example, here, we assume that we may be dealing with the tariff package 5. After the editor 4 has acquired the tariff package 5 in the form of a tree structure, it may be recorded in the XML file such as that described with respect to FIG. 4.

During one stage 142, this XML file may be transmitted to the server 62 via the network 60.

Next, a phase 144 begins from subscription to this tariff package. At the beginning of the phase 144, during one stage 146, the tariff package may be presented to a consumer by the module 64. The consumer uses the item 82 for this effect.

Then, during one stage 148, the consumer selects the tariff packages to which he/she wishes to subscribe and provides the personal information necessary for the operation of this tariff package. For example, in the case of the tariff package 5, the client must furnish their age as well as the information enabling the identification of the parking that will be considered as their residential parking During the stage 148, the client also supplies information enabling unique identification of the smart card inserted in its mobile terminal. For example, the MSISDN Mobile Station ISDN Number of the smart card may be supplied. Thus, during stage 148, the values of all the subscription parameters may be transmitted to the server 62.

Next, during stage 150, the client pays for the tariff package to which he/she may be subscribing.

From this moment on, during stage 152, the converter 66 converts the tariff package subscribed to into an executable code by the smart card of the client. This stage may be described more in detail with respect to FIG. 5.

If the client may be a new client, during stage 154, a new subscriber account may be created in the client's smart card. During this stage 154, the server 62 sends the service provider's certificate to the smart card 86 via a secure channel. The engine 100 records this certificate and also creates a first balance associated with this subscriber account.

Next, during stage 156, the module 68 downloads the executable code generated by the converter 66 in the smart card 86. For example, here, this executable code may be recorded on the smart card 86 as being the application 120. Next, during this stage 156, the application 120 may be activated, i.e., the link 114 may be created. After activation of the application 120 the size of the executable code established in the smart card 86, associated with this smart card's user name, may be recorded in the memory 80.

A subscriber account reference the cryptographic certificate of a service provider, and possesses at least one balance and at least one link to a cost calculating application that belongs to it.

The engine 100 may be then ready to accumulate the costs calculated by the application 120.

Then a phase 160 begins for service consumption proposed by the service provider. More specifically, initially, during stage 162, the client presents his/her terminal 84 near the point of sale 90. A secure communication link then establishes between this terminal 84 and the point of sale 90 via the emitters/receivers 88 and 94.

Once the secure link may be established, during stage 164, the point of sale 90 send a consumption ticket to the terminal 84 containing:
the service provider's user name,
identifier of the service consumed,
consumption data.

For example, in the case of parking, the consumption data may be made up by the duration of the parking. Typically, the consumption data may be encoded with the service provider's private key.

In response to receiving this data, during stage 166, the engine 100 selects the account corresponding to the provider's user name. For example, here, the engine 100 selects account 105*b*.

In the case where no account may be associated with the provider's user name received, the engine 100 rejects the service so that no balance may be debited and the point of sale 90 may be informed of the impossibility of going forward with the payment.

Otherwise, the engine 100 uses a cryptographic DUV as well as the certificate 104 to authenticate the point of sale 90. If the point of sale 90 need not be correctly authenticated, no balance may be debited and the service may be rejected.

In the opposite case, during stage 170, the engine 100 selects the cost calculation application to be executed using the service ID. For example, the engine 100 selects link 114 and therefore, application 120.

During stage 172, the application selected may be executed inside the smart card. This application calculates the cost of the service from the consumption data contained in the consumption ticket then resends the calculated cost to the engine 100. Next, after stage 174, the engine 100 debits the calculated cost from the balance 108. In the case where the balance 108 corresponds to a prepaid account that does not have a sufficient amount, the service may be rejected and no balance may be debited.

Figure 5:
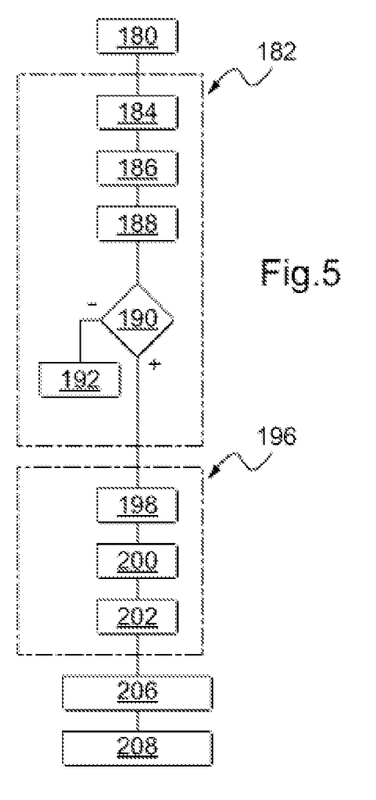
FIG. 5 is an organization chart of a method of conversion of a computational formula in executable code by the smart card in an embodiment.

The method of FIG. 5 shows in more detail the development of stage 152 of conversion of the tariff package in executable code.

Initially, during stage 180, the subscription parameters supplied by the client may be acquired by the module 70. During this stage, module 70 also acquires the smart card's user name 86.

Next, during stage 182, the verifier 72 proceeds to the verification of the embeddedness of the subscribed tariff package in the client's smart card. To do this, during operation 184, the verifier 72 begins to verify the existence all the information needed to embed this tariff package in a smart card. In particular, then this stage 184, the verifier 72 verifies the presence of the information enabling unique identification of the card 86 and also the presence of values for all the subscription parameters contained in the tariff package.

In the case where all the necessary information has been supplied, during stage 186, the verifier 72 estimates the size of the executable code that must be implemented in the smart card 86. In order to do this, the verifier 72 travels through the tree structure of the subscribed tariff package accumulating for each node found a weight representative of the size of the segment of executable code to be implemented in the smart card in order to execute the operation associated with that node.

Before implementing the converter 86, this weight representing the size of the code segment may be determined experimentally for each node susceptible of being used in the editor 4 to define a tariff package. Then, a table may be created that associates the representative weight of the size of the executable code segment to be implemented in the smart card to each node in order to execute the operation for which it may be associated. During stage 186, the verifier 72 uses this table to determine the weight associated with each node found in the tariff package.

Next, during operation 188, the verifier establishes the size of the free usable memory to implement an application in the smart card. During this operation 188, the verifier 72 uses the information supplied by the client on its smart card as well as the information contained in the memory 80 on the other tariff package to which the client has already subscribed. For example, the MSISDN ID enables the maximum size of free memory on the smart card. Next, the size of the executable codes already downloaded in this smart card may be subtracted from this maximum size to establish the limit sought. To this effect, the memory 80 contains a table that associates each client's smart card user name, the size of the executable code already downloaded in this card.

Next, during operation 190, the verifier 72 compares the estimation of the code size obtained during operation 186 with the limit established during operation 188. If the estimation of the code size exceeds the limit established, then, during operation 192, the verifier informs the client that the tariff package to which he/she wishes to subscribe cannot be launched in his/her smart card.

In the opposite case, the method may be continued by a stage 196 to carry out a semantic analysis of the tariff package to which he/she wants to subscribe. More specifically, during operation 198, the analyzer 74 moves the tariff package from the root node to the terminations in order to identify the dead branches of the subscribed to tariff package. In order to do this, the analyzer 74 uses the information acquired from the value of the subscription parameters. For example, it may be here assumed that the client has indicated that he/she may be over 25 years of age. Consequently, the analyzer 74 deducts from this information that nodes 44 and 48 of the tariff package will never be examined. In effect, nodes 44 and 48 need not be activated if the client may be less than 25 years old. Next, the analyzer modifies the tariff package in order to remove the dead branches. For example, here, nodes 42, 44, 48 and 46 may be removed and node 50 may be directly connected to node 36. This modification may be carried out by removing the definition of nodes 42, 44, 48 and 46 from the XML file. This simplifies the tariff package.

In FIG. 4, the nodes removed may be surrounded by a framework 199.

Next, after having removed all the dead branches, during operation 200, the analyzer 74 simplifies the parametric operations. During this operation 200, the analyzer 74 travels through all the tariff package nodes and replaces, whenever it may be possible, the parametric operations using subscription parameters by an operation devoid of the subscription parameters. In this situation, the subscription parameter may be also called "operation parameter". Specifically, if an operation associated with a node tests the value of a subscription parameter in order to execute a single process, chosen from among several possible processes, this operation may be simplified by replacing this test with a pointer to the correct process to be executed. The process may be a simple one, coming from among several possibilities. This operation 200 also thus enables simplification of the tariff package. Specifically, this operation enables simplification of all the operations that implement the logical tests of the type "If A then T1 If not T2", where:

A may be the value of the subscription parameter,

T1 and T2 may be alternative processes to execute.

Simplification of this type of operation leads to, for example, systematically executing the process T1 without testing value A.

Lastly, during operation 202, the analyzer 74 prepares a source code skeleton generator. In order to do this, first, each node operation likely to be used to define a tariff package may be associated with a source code fragment in JavaCard® language. During operation 202, the analyzer travels through the tree structure and through each node encountered adds the source code associated with that node in a file.

In the following table, we assume the pseudo-code may be usable to create this skeleton for different operations associated to a node. This pseudo-code may be readily translated into JavaCard® commands or some other by the professional in the field.

| Type of node | Operations | Pseudo-codes |
|---|---|---|
| Function | Flat | Result = variable |
|  | Ax + b | Result = variable1 * variable2 + variable3 |
| Comparitor | Comparison of numbers | If number1 = number2<br>Then execution branch condition - verified<br>If not<br>Execution of the non-verified branch condition |
|  | Comparison of characters | If string1 contains string2<br>Then execution branch condition - verified<br>If not<br>Execution of the non-verified branch condition |
|  | Comparison of dates | If the day of the week of the date1 = variable1<br>Then execution branch condition - verified<br>If not<br>Execution of the non-verified branch condition |
| Splitter | Splitting a variable into two variables | If variable1 <= limit1<br>Then lowervariable = variable1<br>Greatervariable = 0<br>If not<br>lowervariable = limit1 Greatervariable = variable1 − limit1<br>Execution of the lower branch interval<br>Execution of the greater branch interval |
| Operator | Calculation of a time period between two dates | duration_JHMS = date2 date1<br>duration = convert (duration_JHMS, united) |
|  | Translation Table | if variable1 = line1<br>result = resultatLine1<br>if not if variable1 = line2<br>result = resultatLine2<br>if not . . . |

The name of the variables as well as their values may be defined during the creation of the tariff package and records in the XML file. Here, this may be the role of the tags <Property . . . />.

Next, during stage 206, the generator 76 travels through the tariff package in order to:

replace all the subscription parameters in the source code skeleton with their values as acquired by the module 70, and link the different source code segments together.

Linking the different source code segments together consists in particular indicating how the operations should be linked.

Therefore, at the end of stage 206, the generator 76 generated a complete source code in JavaCard® language that corresponds to the tariff package to which the client may be subscribed.

Lastly, during stage 208, the compiler 78 compiles the source code to obtain a Bytecode better known by the term "JavaCard® applet".

In the preceding steps, travelling through the tree structure may be implemented by using the design pattern "Visitor". For more information on this pattern, please refer to encyclopedias such as Wikipedia®.

Numerous other embodiments may be possible. For example, the different stages and operations described here may be executed in a different order. Typically, the verification of the embeddedness of the executable code may be carried out after the semantic analysis.

The semantic analyzer 74 may perform a simplification of the tariff package either by only removing the dead branches, or by simply settling for simplifying the operations associated with each node from knowing the value of the subscription parameters.

Terminal 84 may also be a PDA Personal Digital Assistant or a laptop computer or any equipment equipped with a smart card "CAD Card Accepting Device".

The communication between the terminal 84 and the server 62 may be carried out via any type of information transmission network. In particular, it need not be necessary to use a wireless telephone network.

Module 64 may be used in a server that may be different from server 62.

That which has been described in detail in the particular case of a tariff package, may be applicable to any computational formula with a tree structure that has been recorded in a digital format.

The client may subscribe to several tariff packages. Implementation and use of each of the tariff packages may be, for example, identical to that that was described with respect to FIGS. 3 and 5. In particular, when several tariff packages may be implemented in the same smart card, these tariff packages may be executed only one at a time and independently from each other. This enables the implementation of very different and more numerous tariff packages than if, as in the patent application WO 02/08863, a single cost calculation application may be used to calculate all the amounts to be accumulated, no matter what service may be to be paid. In fact, this assumes that this single application incorporates all the tariff packages in its executable code to which the client has subscribed. The complexity of this single application therefore grows based on the number of different tariff packages available. With the method described herein, this need not be the case. In fact, only the application specifically associated with a service may be executed. Thus, the complexity of the executable code present on the card, does not increase based on the number of tariff packages to which the client may be subscribed. This characteristic consists of implementing several executable codes in the smart card, independently from each other, of cost calculation applications and of only executing the executable code associated with the service to be paid which may be implemented independently from the conversion method described with respect to FIG. 5. This characteristic may also be applied to computational formulas, specifically to cost computational formulas, that need not be acquired or recorded in the form of a tree structure.

The invention claimed is:

1. A method for converting a computational tariff formula into an executable code stored in a smart card, comprising:

identifying a subscription parameter value for a customizable subscription parameter included in the computational tariff formula;

applying the identified subscription parameter value to a respective parameterized conditional branching operation in the computational tariff formula associated with the subscription parameter, the computational formula recorded in a structured digital format representing a tree structure including nodes interconnected by branches, each node being associated with a computational operation for calculating a tariff and each branch sequence defining an order in which the computational operations are carried out, the tree structure including at least one node associated with the parameterized conditional branching operation and connected to a plurality of child nodes;

identifying one of the plurality of child nodes connected to the parameterized conditional branching operation satisfying the identified subscription parameter value;

replacing the parameterized conditional branching operation in the computational formula with a pointer to the identified child node by a computer processing device;

removing remaining non-identified child nodes from the tree structure connected to the replaced parameterized conditional branching operation by the computer processing device;

reducing a size of the compiled formula by compiling the computational tariff formula after replacing the parameterized conditional branching operation in the computational formula and removing the remaining non-identified child nodes from the tree structure by the computer processing device;

converting the reduced size computational formula to code executable by the smart card and storing the reduced size compiled computational formula in the smart card.

2. The method according to claim 1, wherein the tree structure has at least one node associated with a parametric operation including a plurality of alternatively executable processes, each alternative process associated with a corresponding operational parameter value required to execute each alternative process.

3. The method of claim 2, further comprising:
applying a value of an operational parameter to the computational formula;
identifying one of the alternative processes having its corresponding operational parameter value matching the applied value;
removing remaining alternative processes having corresponding operational parameter values that do no match the applied value; and
compiling the computational formula after removing the remaining alternative processes from the computational formula.

4. The method of claim 1, wherein the structured digital format is a Standard Generalized Markup Language (SGML) format.

5. The method of claim 4, wherein the structured digital format is an eXtensible Markup Language (XML) format.

6. A method according to claim 1, further comprising:
associating a weight with each node, the weight representing a size of an executable code fragment on the smart card to execute a respective computational operation associated with a respective node;
aggregating the weights associated with nodes having respective computational operations included as part of a selected computational formula to estimate a total size of executable code associated with the selected computational formula; and
comparing the estimate of the total size of executable code to a preset limit to identify whether the limit has been exceeded.

7. The method of claim 1, wherein the computational tariff formula is a pricing formula to calculate a cost of a service.

8. A method for reducing a size of a computational formula for implementation in a smart card, the method comprising:
identifying a subscription parameter value for each customizable subscription parameter included in the computational formula;
applying each identified subscription parameter value to a respective parameterized conditional branching operation in the computational formula associated with the subscription parameter, the computational formula recorded in a structured digital format representing a tree structure including nodes interconnected by branches, each node being associated with a computational operation and each branch sequence defining an order in which the computational operations are carried out, the tree structure including at least one node associated with the parameterized conditional branching operation and connected to a plurality of child nodes;
identifying one of the plurality of child nodes connected to each respective parameterized conditional branching operation satisfying each respective identified subscription parameter value;
replacing each respective parameterized conditional branching operation in the computational formula with a pointer to the respective identified child node by a computer processing device;
removing remaining respective non-identified child nodes from the tree structure connected to the respective replaced parameterized conditional branching operation by the computer processing device;
reducing the size of computational formula by compiling the computational formula after replacing each respective parameterized conditional branching operation and removing the respective remaining non-identified child nodes from the tree structure by the computer processing device;
converting the reduced size computational formula to code executable by the smart card;
downloading the executable code to the smart card; and
executing the executable code in the smart card responsive to receiving consumption data for a service to calculate a cost of consuming the service according to the computational formula.

9. The method of claim 8, further comprising:
associating a weight with each node, the weight representing a size of an executable code fragment on the smart card to execute a respective computational operation associated with a respective node;
aggregating the weights associated with nodes having respective computational operations included as part of a selected computational formula to estimate a total size of executable code associated with the selected computational formula;
identifying an available capacity of executable code on the smart card; and
comparing the estimate of the total size of executable code to the identified available capacity.

10. The method of claim 9, wherein a total capacity of the smart card and a size of previously downloaded executable code on the smart card are identified based on an identifier of the smart card to identify the available capacity of the smart card.

11. The method of claim 8, further comprising:
downloading a plurality of executable codes, each of the executable codes including a service identifier and a computational formula for calculating a cost of a service associated with the service identifier;

comparing a consumed service identifier from the received consumption data to the service identifiers in the plurality of executable codes to identify an executable code with a matching service identifiers; and executing the identified executable code to calculate the cost of the service associated with the service identifier.

12. A converter to covert a computational tariff formula into an executable code for a smart card, the converter comprising:

an acquisition module to acquire a subscription parameter value for a customizable subscription parameter included in the computational tariff formula;

a non-transitory information recording medium to store a computational formula recorded in a structured digital format representing a tree structure including nodes interconnected by branches, each node being associated with a computational operation for calculating a tariff and each branch sequence defining an order in which the computational operations are carried out, the tree structure including at least one node associated with a parameterized conditional branching operation and connected to a plurality of child nodes;

a semantic analyzer to apply the acquired subscription parameter value to the parameterized conditional branching operation associated with the subscription parameter, identify one of the plurality of child nodes connected to the parameterized conditional branching operation satisfying the identified subscription parameter value, replace the parameterized conditional branching operation in the computational formula with a pointer to the identified child node, and remove remaining non-identified child nodes from the tree structure connected to the replaced parameterized conditional branching operation; and a processing device to reduce a size of the compiled formula by compiling the computational formula after replacing the parameterized conditional branching operation in the computational formula and removing the remaining non-identified child nodes from the tree structure and convert the reduced size computational formula to code executable by the smart card.

* * * * *